H. GORTNER.
Apparatus for Separating Gum from Cane Juice.
No. 58,095.
Patented Sept. 18, 1866.
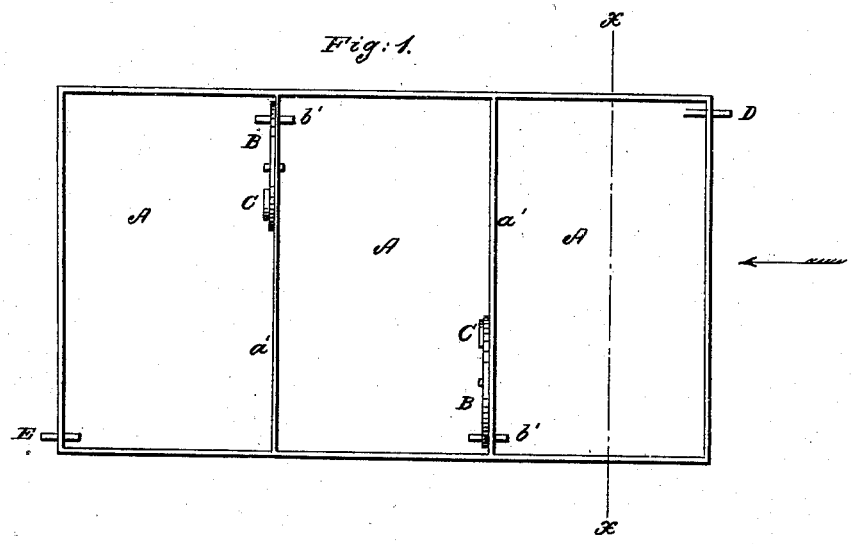
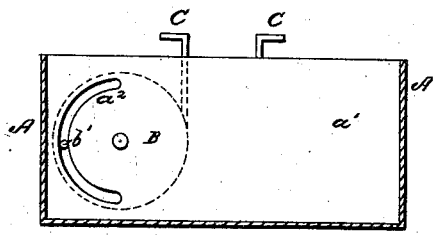

UNITED STATES PATENT OFFICE.

HENRY GORTNER, OF DEAVERTOWN, OHIO.

IMPROVED APPARATUS FOR SEPARATING GUM FROM CANE-JUICE.

Specification forming part of Letters Patent No. 58,095, dated September 18, 1866.

*To all whom it may concern:*

Be it known that I, HENRY GORTNER, of Deavertown, Morgan county, and State of Ohio, have invented a new and useful Apparatus for Separating the Gummy Substance from Cane-Juice; and I do hereby declare that the following is a full, clear, and exact description thereof, which will enable others skilled in the art to make and the same, reference being had to the accompanying drawings, forming part of this specification, in which—

Figure 1 is a top or plan view of my improved apparatus. Fig. 2 is a vertical section of the same, taken through the line $x\ x$, Fig. 1.

Similar letters of reference indicate like parts.

My invention has for its object to furnish a convenient apparatus by means of which the gummy substance that comes with the cane-juice from the mill may be readily and thoroughly separated therefrom; and it consists, principally, in the combination of circular disks with the partitions of the apparatus, as hereinafter more fully described.

A is the box or pan, which may be made of wood or metal, as may be most convenient. This box or pan A is divided by partitions $a'$ into three or more compartments. These partitions are perforated with semicircular slots $a^2$, extending from near their top to near their bottom, as shown in Fig. 2. B are circular disks pivoted to the partitions $a'$. These disks B are of such a size as to cover the semicircular slots $a^2$, over which they fit so closely as to prevent the leakage of the juice from one compartment to another. C are levers attached to the disks, by means of which the disks are revolved, as desired. $b'$ are small pipes, which pass through the disks B and through the slots $a^2$, as shown in the drawings.

The juice is introduced into one of the compartments of the apparatus near one corner through a pipe, D. The juice is allowed to stand in the compartment until the gummy substance settles to the bottom. The disks B and pipe $b$ are then so arranged as to draw off the juice into the next compartment, leaving the gummy substance and other impurities in the bottom of the compartment. In the same manner the juice is passed through the other compartments of the apparatus, and finally it is drawn off through the pipe E into the evaporating-pan.

It will be observed that the juice is always drawn from the compartments at the opposite end from that at which it enters said compartments, and that by properly arranging the disks B and pipes $b'$ the juice may be drawn off so gently as not to disturb the sediment that has settled to the bottom of said compartments.

I claim as new and desire to secure by Letters Patent—

An improved apparatus for separating the gummy substance from cane-juice, formed by the combination of the disks B and pipes $b'$ with the partitions $a'$ of the apparatus, the various parts being constructed and arranged substantially as herein described, and for the purposes set forth.

HENRY GORTNER.

Witnesses:
STEPHEN C. FRAMPTON,
J. M. WEAVER.